US005540380A

United States Patent [19]
Bryant

[11] Patent Number: 5,540,380
[45] Date of Patent: Jul. 30, 1996

[54] FILE FOLDER ENVELOPE

[76] Inventor: William J. Bryant, 121 Sable Crescent, North Bay, Ontario, Canada, P1A 3X6

[21] Appl. No.: 276,639

[22] Filed: Jul. 18, 1994

[30] Foreign Application Priority Data

May 12, 1994 [CA] Canada ................................. 2123464

[51] Int. Cl.⁶ .................................................. B65D 27/22
[52] U.S. Cl. ............................... 229/67.1; 229/76; 229/82
[58] Field of Search ............................ 229/67.1, 76, 82, 229/84; 383/35, 98, 99; 206/308.1, 308.3

[56] References Cited

U.S. PATENT DOCUMENTS

| 768,340 | 8/1904 | Ormsbee, Jr. ................... 229/76 X |
|---|---|---|
| 868,835 | 10/1907 | Bexell ............................... 229/67.1 X |
| 1,223,569 | 4/1917 | Deutschmeister ..................... 229/76 |
| 1,790,415 | 1/1931 | Fischer et al. ..................... 383/35 X |
| 4,349,107 | 9/1982 | Pritchard ......................... 229/82 X |
| 4,667,819 | 5/1987 | Lu . | |
| 4,971,195 | 11/1990 | Mitsuyama . | |
| 5,031,772 | 7/1991 | Woodriff ......................... 206/308.3 |
| 5,275,438 | 1/1994 | Struhl . | |

FOREIGN PATENT DOCUMENTS

| 0056685 | 7/1982 | European Pat. Off. . |
|---|---|---|
| 0286987 | 10/1988 | European Pat. Off. . |
| 9314049 | 2/1994 | Germany . |
| 564462 | 9/1944 | United Kingdom ................ 229/76 |

Primary Examiner—Jes F. Pascua
Attorney, Agent, or Firm—Pascal & Associates

[57] ABSTRACT

A retainer for a flat object comprised of an envelope having front and rear planar members forming a pocket open at one end and for containing the flat object, and joined along opposite side edges, the planar member having a centrally located tongue projecting forward of the one end, the tongue being resiliently bendable adjacent the front end around an end and under a contained object so as to lie against an inside surface of the rear planar member, the width of the tongue being a fraction of the width of the planar members, the inside width of the envelope between the side edges being wider than the flat object by a distance sufficient to lift the tongue from under the contained object when the edges of the envelope are compressed toward each other and toward adjacent edges of the contained object.

2 Claims, 3 Drawing Sheets

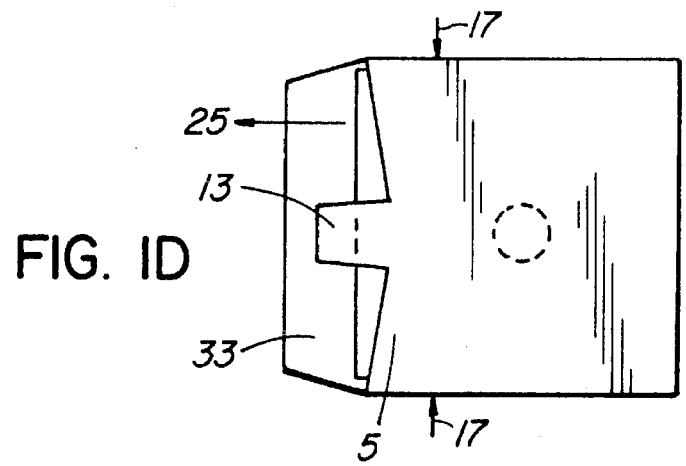
FIG. 1D
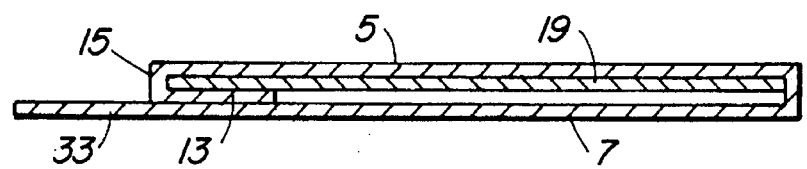
FIG. 2A
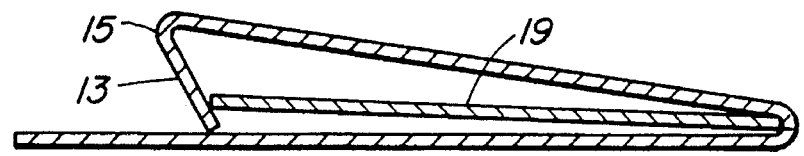
FIG. 2B
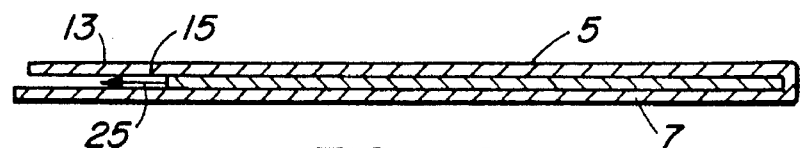
FIG. 2C
FIG. 3
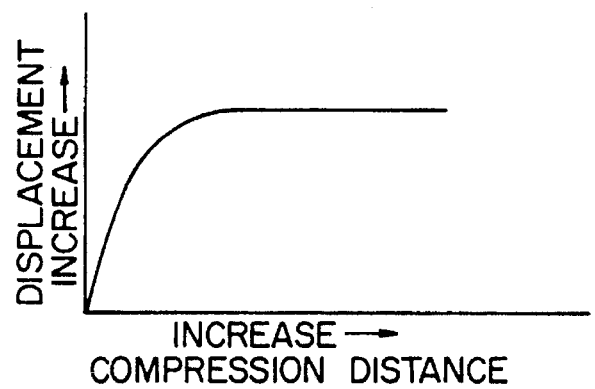

FILE FOLDER ENVELOPE

FIELD OF THE INVENTION

This invention relates to a retainer for a flat object such as a floppy disk, tile, picture, booklet, sample or the like, which can be fixed to a file folder or other storage or display substrate and make the flat object easily available for use.

BACKGROUND TO THE INVENTION

Persons who use floppy disks for magnetically storing computer data typically store the disks in groups, in containers which are displaced from paper files which refer to them. To access an appropriate disk, typically a paper file must be accessed to determine which floppy disk corresponds, and then the disk container referred to in the file is retrieved, whereby the correct disk can be removed for use. This is in inconvenient, since several steps must be undertaken to identify and retrieve the correct disk.

If the disk is stored with the file, it may easily slip out of its safety envelope, thus subjecting it to potential damage within the file, and it may easily slip out of the file, thus causing waste of time to find and retrieve the disk, if it is retrievable. Thus valuable information stored on the disk may be lost.

A commonly used floppy disk container is described in U.S. Pat. No. 4,368,817, in which disks are stored typically in 10 packs. However this container must be separated from related paper files due to its structure and shape.

U.S. Pat. No. 4,762,225 describes an envelope shaped disk retainer in the form of an open envelope which has a tongue 66 that extends over its open end, and thus retains groups of flat objects such as compact (or floppy) disks in it. This container must also be separated from related paper files due to its structure and shape.

U.S. Pat. No. 4,667,819 describes a retention device for a floppy disk which can be associated with a paper file, and uses a tongue which folds over the floppy disk and thus retains it in place. However, in this structure the tongue and holding flaps may be easily released, and the floppy disk can later inadvertently slip out and be dirtied or lost.

SUMMARY OF THE INVENTION

In accordance with the present invention, a retainer for a flat object such as a floppy disk can be fixed to the inside of a file folder, and retain the flat object with security, no matter which way the file folder is held or shaken. Thus the disk not only is retained with the file to which it pertains, but is also retained with security.

To release the flat object, the edges of the retainer are compressed toward each other, and a retaining lock for the disk, which is in the form of a tongue, pops open, releasing the security for the disk, and allowing it to be freely removed.

In accordance with an embodiment of the invention, a method of retaining a flat object is comprised of guiding the flat object into an envelope which is comprised of front and rear planar members forming a pocket open at one end, and joined along opposite side edges. The front planar member has a tongue projecting forward of the one end, which is bendable adjacent the front end. The width of the tongue is a fraction of the width of the planar member, and the width of the envelope between the side edges are wider than the flat object by a distance sufficient to lift the tongue from under the flat object when the edges of the envelope are compressed toward each other and toward adjacent edges of the flat object. The tongue is then bent around the flat contained object and tucked between the flat object and an inside surface of the rear planar member. The flat object is thus securely held in the envelope, even if the envelope is turned with its opening facing downwardly.

To release the object, the edges of the envelope are compressed toward each other and toward adjacent edges of the flat object so as to cause the front planar member to bow upwardly and lift the tongue from under the contained flat object, thereby releasing the flat object, and then removing the flat object from the envelope.

In accordance with another embodiment, a retainer for a flat object is comprised of an envelope having front and rear planar members forming a pocket open at one end and for containing the flat object, and joined along opposite side edges, the planar member having a centrally located tongue projecting forward of the one end, the tongue being resiliently bendable adjacent the front end around an end and under a contained object so as to lie against an inside surface of the rear planar member, the width of the tongue being a fraction of the width of the planar members, the inside width of the envelope between said side edges being wider than the flat object by a distance sufficient to lift the tongue from under the contained object when the edges of the envelope are compressed toward each other and toward adjacent edges of the contained object.

It should be understood that while the description of the preferred and any other embodiment in this specification will refer to the retention of a floppy disk, it is intended that the invention is equally applicable to retention of other flat objects, such as CD ROMs, tiles, pictures, booklets, samples, etc., and while retention in a file will be described, retention can be made in salesman's display books, manuals, binders, or other generally flat substrates or the equivalent.

BRIEF INTRODUCTION TO THE DRAWINGS

A better understanding of the invention will be obtained by reading the description of the invention below, with reference to the following drawings, in which:

FIGS. 1A–1D are plan views of an embodiment of the invention illustrating the structure and a sequence of operation of the invention, FIGS. 2A–2C are sectional views, the first along section line A—A of FIG. 1C, of an embodiment of the invention, illustrating the structure and the sequence of operation of the invention, FIG. 3 is a graph of displacement vs. compression which is used to illustrate operation of the invention, FIG. 4 is a folded out plan view of an embodiment of the invention, prior to assembly, and FIG. 5 is a rear view of an embodiment of the invention after assembly of the structure of FIG. 4.

DESCRIPTION OF PREFERRED EMBODIMENT OF THE INVENTION

Figure 1A:
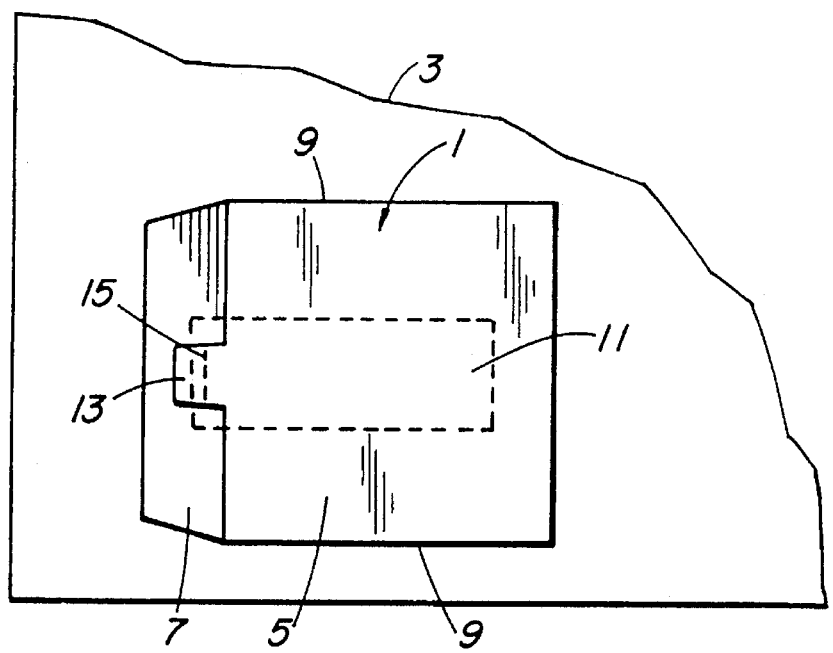

An envelope 1, preferably formed of cardboard such as uncorregated two ply cardboard, but which may alternatively be made of another fairly stiff material which may be bowed and bent such as plastics material, is fixed to a substrate 3 such as the inside of a file folder. In the preferred embodiment, the envelope is formed of front and rear planar members 5 and 7 joined along opposite side edges 9.

The outside of the rear planar member is adherent to the substrate preferably and conveniently by means of double sided adhesive tape, shown in phantom as reference numeral 11. However other means for fixing the envelope to the substrate may be used. For example, adhesive could be applied to the rear planar member for attachment to the substrate by means other than adhesive tape. However it is important that a fraction of the width of the envelope adjacent each edge 9 should not be adherent to the substrate, for the reason to be described below.

The front planar member 5 has a tongue 13 which projects forward of the open end of the envelope. The tongue is resiliently bendable toward the rear planar member 7 along a line 15 which is adjacent the open end of the envelope. The width of the tongue is a fraction of the width of the planar members 5 and 7.

Figure 1B:
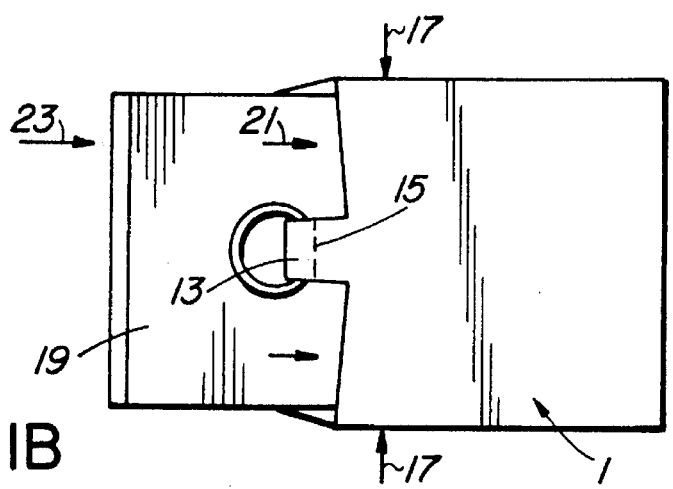

In operation, as shown in FIG. 1B, the edges of the envelope are compressed toward each other in the directions of arrows 17, to slightly bow out the envelope. The flat object 19, such a floppy disk, is pushed into the open envelope, in the direction of arrow 21, using pressure against the object 19 in the direction of arrow 23.

Figure 1C:
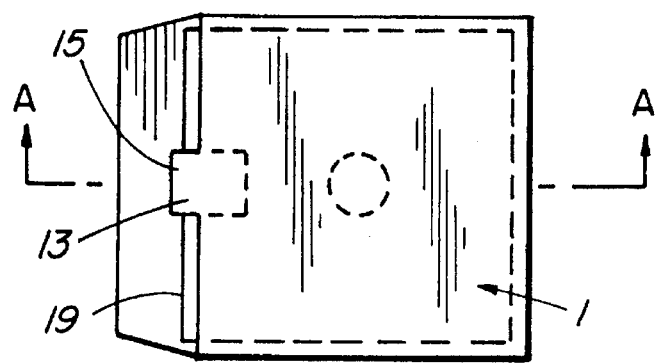

The tongue is then bent around the end of the flat object along line 15, and is tucked between underside of the flat object and the inside surface of the rear planar member, as shown in FIGS. 1C and 2A.

It will be found that due to the pressure of the envelope folds and the width of the flat object retaining the envelope shape in a generally flat configuration, and the combined stiffness of the flat object, the substrate and the evelope, the tongue is held in position under the flat object. Now if the envelope is turned with its open end down, which would normally cause the flat object to slip out from the envelope, it is held securely in place due to the action of the tongue tucked between the flat object and the rear planar member. Indeed, the weight of the flat object against the inside of the tongue at the location of the fold line does not exert any significant opening force which would otherwise allow release of the tongue and thus cause the release and potential damage or loss of the flat object.

To release the flat object, with reference to FIG. 1D, the edges of the envelope are compressed against each other in the direction 17. Since the front planar member 5 is forced to bow outwardly. As a result, the tongue 13 is lifted, and pops out from under the flat object, taking the position generally as shown in FIG. 2B. The actual position may vary from that shown, depending on the resilience of the material at the bend, i.e. the resilience of the material of the front planar member in the region of the tongue and/or the tongue material.

The tongue, while preferably being formed integral with the front planar member, can alternatively be formed as an add-on tab which is fixed to the surface of and overlaps the front planar member. Thus the invention may be made for example as an integral piece, or as an envelope without the tongue, with the tongue being added as a self-adhesive strip later as required. Thus the resilience of the envelope material and the resilience of the tongue may be different. Indeed, the tongue may be made of more than one piece, or may be fixed to the front planar member by an intermediate member, whereby the material which is subjected to bending along the bending line has a different resilience than that of the tongue and/or front planar member.

FIGS. 1D and 2C illustrate the invention with the flap restraightened into a position which is approximately parallel with the front and rear planar members, allowing the flat object 19 to be removed from the front of the envelope, in the direction shown by arrow 25.

FIG. 3 illustrates a graph of compression distance of the envelope sides (the decrease in width of the envelope caused by compression in the direction of arrows 17) and the resulting displacement of the front and rear planar members (the bowing distance between the front and rear planar members). It will be noted that from the flat envelope configuration, a small compression distance results firstly in a large displacement (high slope of the curve), changing to very low displacement (when the edges of the envelope have moved significantly toward each other).

In order to operate satisfactorily, the inside width of the envelope between the side edges should be wider that the flat object by a distance sufficient to lift the tongue from under the contained object when the edges of the envelope are compressed toward each other and toward the adjacent edges of the contained object. For retaining a 3½ inch wide floppy disk, in a successful prototype the width of the envelope was about 4¼ inches, the length of the tongue was about 1¼ inches and the width of the tongue was about 1⅛ inches, tapering toward its end where its width was about ¾ inches. The edges of the envelope were compressed toward each other approximately ½ inch to have the tongue pop out from under the disk and thus release it. Other tongue sizes and shapes could be used as required.

Figure 4:
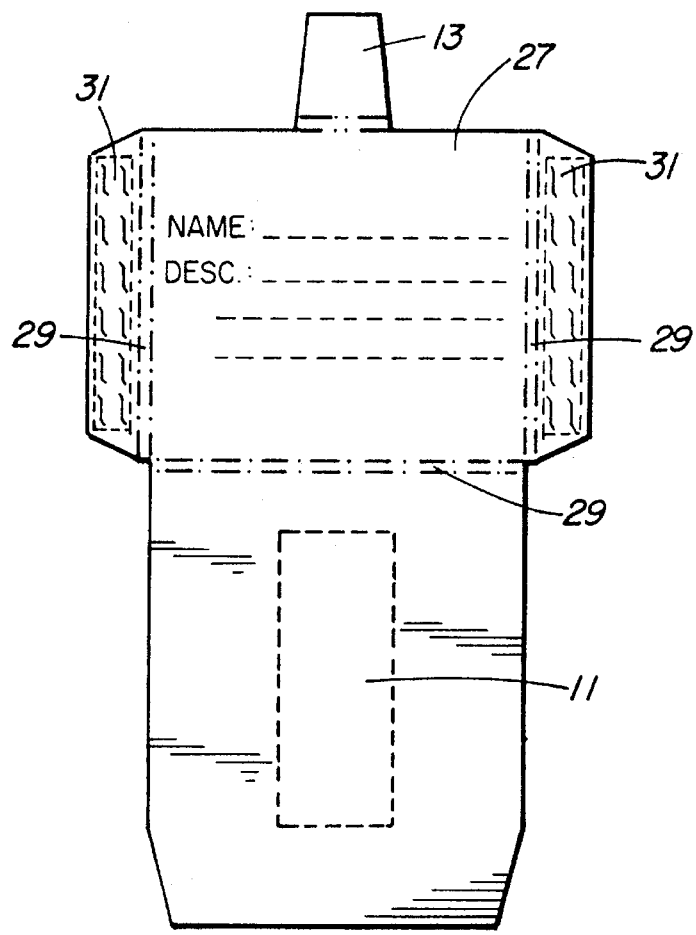
Figure 5:
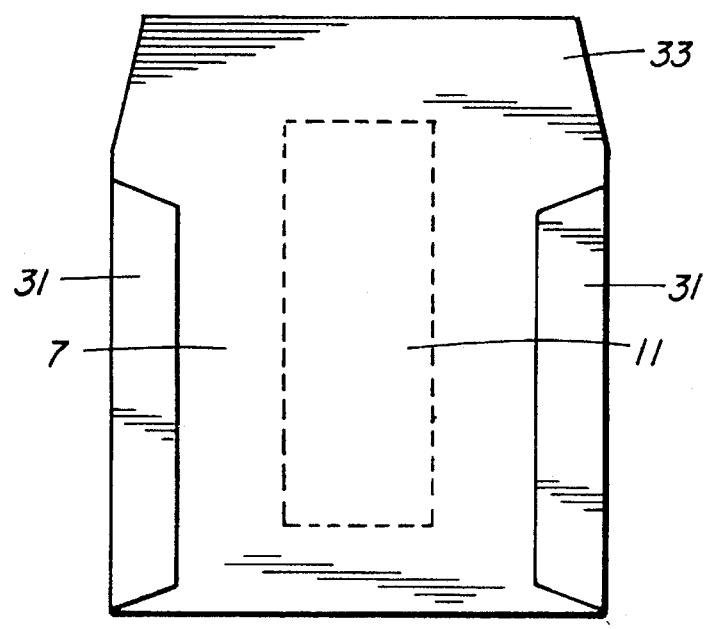

FIG. 4 illustrates a die cut integral piece of cardboard 27 which can be folded along lines 29 to form the envelope 1 as shown in FIG. 1A. FIG. 4 illustrates the rear of the envelope, with tabs 31 folded over and glued to the rear planar member 7 to form the envelope.

It is also preferred that the rear planar member 7 should be extended to form a lip 33, (also illustrated in FIGS. 1A–1D and 2A–2C), to form a guide to aid in sliding the flat object into the envelope.

It should be noted that the envelope may be constructed with the substrate 3 itself forming at least part of the rear planar member of the envelope. For example, the tabs 31 can be made with sufficient width that they can be fastened e.g. by adhesive, to the substrate, the tabs thus forming part of the rear planar member of the envelope. In this case regions of the tabs adjacent their opposite edges should remain unadherent, to allow them to be compressed toward each other a sufficient amount to allow release of the tongue from around the flat object when it is retained within the envelope.

A person understanding this invention may now conceive of alternative structures and embodiments or variations of the above. All of those which fall within the scope of the claims appended hereto are considered to be part of the present invention.

I claim:

1. A method of retaining a flat object comprising:
    (a) guiding the flat object into an envelope which is comprised of front and rear planar members forming a pocket open at one end, and joined along opposite side edges, the front planar member having a tongue projecting forward of said one end which is bendable adjacent said one end, the width of the tongue being a fraction of the width of the planar member, and the width of the envelope between said side edges being wider than the flat object by a distance sufficient to lift the tongue from under the flat object when the edges of the envelope are compressed toward each other and toward adjacent edges of the flat object,
    (b) bending the tongue around the flat contained object and tucking it between the flat object and an inside surface of the rear planar member, and (c) the further step of compressing the edges of the envelope toward each other and toward adjacent edges of the flat object so as to cause the front planar member to bow upwardly and lift the tongue from under the contained flat object, thereby releasing the flat object, and then removing the flat object from the envelope.

2. A method as defined in claim 1 including the preliminary step of fixing a central portion of the rear planar member to a substrate whereby fractions of the rear planar member adjacent said opposite side edges remain not fixed to the substrate.

* * * * *